United States Patent
Patel et al.

(10) Patent No.: US 8,961,151 B2
(45) Date of Patent: Feb. 24, 2015

(54) TURBOCHARGER

(75) Inventors: Fahim Ismail Patel, Dewsbury (GB); James Alexander McEwen, Brighouse (GB)

(73) Assignee: Cummins Ltd., Huddersfield (GB)

( * ) Notice: Subject to any disclaimer, the term of this patent is extended or adjusted under 35 U.S.C. 154(b) by 61 days.

(21) Appl. No.: 13/437,272

(22) Filed: Apr. 2, 2012

(65) Prior Publication Data

US 2013/0011276 A1 Jan. 10, 2013

(30) Foreign Application Priority Data

Apr. 2, 2011 (GB) .................................. 1105690.0

(51) Int. Cl.
| | | |
|---|---|---|
| F04D 29/10 | (2006.01) | |
| F02C 6/12 | (2006.01) | |
| F01D 11/00 | (2006.01) | |
| F01D 11/06 | (2006.01) | |
| F02B 39/14 | (2006.01) | |

(52) U.S. Cl.
CPC ................. *F02C 6/12* (2013.01); *F01D 11/003* (2013.01); *F01D 11/06* (2013.01); *F02B 39/14* (2013.01); *F04D 29/102* (2013.01)
USPC ........................................................ 417/407

(58) Field of Classification Search
CPC ..... F04D 29/104; F04D 29/122; F04D 29/12; F04D 29/102
USPC ..................................... 417/406–409, 423.11
See application file for complete search history.

(56) References Cited

U.S. PATENT DOCUMENTS

| | | | |
|---|---|---|---|
| 3,588,125 A | | 6/1971 | Mastromatteo |
| 4,196,910 A | * | 4/1980 | Aizu ............................. 277/419 |
| 4,447,062 A | * | 5/1984 | Leicht ........................... 277/347 |
| 4,865,332 A | | 9/1989 | Ruetz |
| 5,076,765 A | * | 12/1991 | Yagi et al. ..................... 417/407 |
| 5,192,083 A | * | 3/1993 | Jones et al. ................... 277/411 |
| 5,377,216 A | * | 12/1994 | Nilsen et al. .................... 372/58 |

(Continued)

FOREIGN PATENT DOCUMENTS

| | | |
|---|---|---|
| DE | 3737932 A1 | 5/1989 |
| EP | 1387061 A2 | 2/2004 |

(Continued)

OTHER PUBLICATIONS

United Kingdom Search Report GB1105690.0, Cummins Ltd., Jul. 27, 2011.

*Primary Examiner* — Bryan Lettman
(74) *Attorney, Agent, or Firm* — Krieg DeVault LLP

(57) ABSTRACT

A turbocharger shaft interconnects the compressor impeller and the turbine wheel and a bearing housing between the compressor and turbine houses a bearing assembly supporting the turbocharger shaft rotation. A shaft bore defined in at least one of the compressor, turbine or bearing housings receiving the shaft. A sealing arrangement for restricting leakage of lubricant along the shaft bore from the bearing housing to the compressor or turbine housing. The sealing arrangement comprises at least one sealing ring around the shaft in the shaft bore and a gas passage communicating with the shaft bore. A gas distribution circuit includes a valve movable between a first position in which gas passage is in communication with a gas supply path for supplying gas to the shaft bore and a second position in which the gas passage is in communication with a vent path for venting gas from the shaft bore.

19 Claims, 2 Drawing Sheets

(56) References Cited

U.S. PATENT DOCUMENTS

| | | |
|---|---|---|
| 6,017,184 A | 1/2000 | Aguilar et al. |
| 2005/0188694 A1 | 9/2005 | Frankenstein |
| 2006/0236695 A1 | 10/2006 | Aguilar |
| 2010/0143114 A1 | 6/2010 | Purdey |

FOREIGN PATENT DOCUMENTS

| | | |
|---|---|---|
| WO | 2004/063535 A1 | 7/2004 |
| WO | 2006038944 A1 | 4/2006 |

* cited by examiner

TURBOCHARGER

RELATED APPLICATIONS

The present application is related to, and claims priority to United Kingdom Patent Application No. 1105690.0 filed Apr. 2, 2011, which is incorporated herein by reference.

The present invention relates to a turbocharger and in particular to a sealing arrangement for a lubrication system of a turbocharger.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

The turbocharger shaft is conventionally supported by journal and thrust bearings, including appropriate lubricating systems, located within a central bearing housing connected between the turbine and compressor wheel housing. It is important to provide an effective sealing arrangement at each end of the rotating shaft to prevent oil leakage from the central bearing housing into the compressor or turbine housing At the compressor end of the turbocharger, during normal engine-fired mode, the sealing arrangement has to be able to withstand the increasingly high boost pressures that are delivered by modern turbochargers. The pressure of the bearing housing is effectively at the same pressure as the engine oil sump (typically around 100 millibar) and there is thus a pressure gradient between the bearing housing and the compressor housing which prevents the leakage of lubrication oil from the bearing housing into the compressor housing. The sealing arrangement typically comprises one or more ring seals arranged between the shaft and the bearing housing and received in respective grooves, in the manner of piston rings. The seals are arranged with a radial clearance so as to allow the passage of gas in small volumes across the seals but to choke the flow so to accommodate the pressure drop.

At the turbine end there is a similar sealing arrangement using piston ring seals. Although the pressure within the bearing housing varies, it will generally be higher than the pressure in the turbine housing behind the turbine wheel (the back side of the turbine wheel which is proximate the bearing housing). During normal engine-fired mode the pressure drop from the bearing housing to the turbine housing is such that there is a risk of oil leakage from the bearing housing into the turbine housing and thus into the exhaust gas flow. This is undesirable as the high temperatures within the turbine cause the oil to coke and deposits build up within the housing that adversely affect the turbine performance. The presence of the ring seals mitigates this risk.

Engine or exhaust braking systems of various forms are widely used in vehicle engine systems, particularly in relation to diesel engines used to power large vehicles such as trucks. The engine brake systems may be employed to enhance the effect of the conventional friction brakes acting on the vehicle wheels or, in some circumstances, may be used independently of the normal wheel braking system, for instance to control down hill speed of a vehicle. A conventional form of engine brake system employs an exhaust valve in the exhaust line to block substantially the engine exhaust flow path when braking is required. This produces an engine braking torque by generating a high back pressure that acts on the engine pistons during the exhaust stroke. With some engine brake systems, the brake is set to activate automatically when the engine throttle is closed (i.e. when the driver lifts his foot from the throttle pedal), and in others the engine brake may require manual activation by the driver, such as depression of a separate brake pedal.

When the exhaust valve is substantially closed so as to effect engine braking by creating the back pressure that brakes the engine, the restriction of the exhaust flow means that the rotational speed of the turbine of the turbocharger is reduced significantly. The compressor wheel thus rotates at a correspondingly low speed with the result that the compressor boost air pressure delivered to the engine is significantly reduced.

At low speeds such as when the engine is idling or during exhaust braking, the low (or even negative) boost pressure at the compressor end can drop below the pressure in the bearing housing, particularly when the pressures in the bearing housing are elevated by crankcase gas pressure. As a result of the low pressure difference across the seals oil is able to leak along the turbocharger shaft in the bearing housing, past the seals and into the compressor housing, particularly if idling or operating in engine braking mode occurs for extended periods of time. The reduction in rotational speed of the shaft means that pressure behind the turbine wheel increases which exacerbates the tendency of the oil to travel along the shaft to the compressor housing. Leakage of oil into the compressor housing is undesirable as it contaminates the pressurised air entering the engine intake manifold.

Immediately after the engine brake is released and normal engine fired mode is resumed, there is a short period during which the shaft accelerates to a steady state. In this period the pressure in the turbine housing is relatively low and there is a risk of oil leaking into the turbine housing from the bearing housing. This is undesirable for the reasons mentioned above.

In turbocharged engines it is possible to achieve engine braking by employing a variable geometry turbocharger instead of using an exhaust valve. Variable geometry turbines differ from fixed geometry turbines in that the size of a turbine exhaust gas inlet passageway can be varied to optimise gas flow velocities over a range of mass flow rates so that the power output of the turbine can be varied to suit varying engine demands. In order to achieve engine braking, the inlet passageway may simply be closed to its minimum flow area when braking is required and the level of braking may be modulated by control of the inlet passageway size by appropriate control of the variable geometry.

It is also desirable to limit the blow-by of air past the seals in the direction from the compressor into the bearing housing. This air tends to mix with oil spray in the bearing housing from where it can escape into the crank case of the engine and add to other blow-by gases from the engine combustion cylinders. Such gases are filtered and vented and/or circulated to the inlet of the engine system. In a turbocharged engine these are typically fed back into the air inlet of the compressor.

It is one object of the present invention to obviate or mitigate the aforesaid disadvantages. It is also an object of the present invention to provide for an improved or alternative turbocharger.

According to a first aspect of the present invention there is provided a turbocharger comprising a compressor for delivering pressurised air to an intake of an internal combustion engine, a turbine for receipt of exhaust gas from the engine, the turbine comprising a turbine housing and a turbine wheel disposed in the turbine housing, the compressor comprising a compressor housing and a compressor impeller disposed in the compressor housing, a turbocharger shaft interconnecting the compressor impeller and the turbine wheel, a bearing housing disposed between the compressor and turbine for housing a bearing assembly to support the turbocharger shaft in rotation, a shaft bore defined in at least one of the compressor, turbine or bearing housings for receipt of the shaft, a sealing arrangement for restricting leakage of lubricant along the shaft bore from the bearing housing to the compressor or turbine housing, the sealing arrangement comprising at least one sealing member disposed around the shaft in the shaft bore and a gas passage communicating with the shaft bore, and a valve movable between a first position in which gas passage is in communication with a gas supply path for supplying gas to the shaft bore and a second position in which gas passage is in communication with a vent path for venting gas from the shaft bore.

The movement of the valve ensures that gas flow can be switched between feeding relatively high pressure gas (e.g. air) to the shaft bore in order to reduce the risk of leakage and venting gas from the shaft bore to reduce blow-by gases. The feeding of relatively high pressure gas may be conducted during certain operating conditions. For example, it may be fed to the shaft bore at a compressor end of the turbocharger shaft when the pressure in the compressor housing adjacent to the sealing arrangement is relatively low such as, for example, engine idling or engine braking. The venting may be conducted when the pressure drop over the sealing member in the shaft bore is relatively high to allow pressurised gas (e.g. air) from the compressor or turbine end to be discharged.

The at least one sealing member may take any suitable form. It preferably circumscribes the shaft and may be supported on an annular surface defined by the shaft bore. It may extend towards the shaft and may be received in a groove defined on the outer surface of the shaft or on an outer surface of a component mounted on the shaft such as, for example, a boss of an oil slinger.

The at least one sealing member may be a deformable ring. It may be a metal ring such as, for example, a split piston ring.

There may be a pair of axially spaced sealing members in the shaft bore. The gas passage may be in communication with a space between the sealing members. There may be more that two sealing member. Each sealing member may be received in a respective groove defined in an outer surface of the shaft or a component mounted on the shaft.

The gas supply path may be in communication with a location in the turbocharger which is a source of relatively high pressure such as the compressor outlet. Alternatively, or in addition, it may be connected to the turbine housing. Gas may be supplied to gas supply path from the regional of highest pressure; alternatively there may be a second valve that controls which source is in communication with the gas supply path.

The gas vent path may be in communication with the compressor inlet and/or atmosphere so that gas from the shaft bore is vented to one or both of these locations.

There may be a check valve in the vent path to ensure that gas is vented only when it reaches a certain pressure.

The gas passage may be defined in the compressor housing, turbine housing or in the bearing housing. It may be defined in a back plate of the compressor or turbine housing.

The valve may have a control input for receiving a control signal that determines the position of the valve. The valve may comprise a valve member such as a shuttle that is moveable dependent on the control signal. The control signal may be a pressure signal whereby the control input is connected to the compressor or turbine housing, preferably at a location that is in fluid communication with the sealing arrangement. For example, it may be connected to a back face of the compressor or turbine i.e. the side of the compressor or turbine that is proximate the sealing arrangement. Alternatively the control signal may be an electrical signal in which case the control input is provided by an electrical signal from an engine control unit.

The sealing arrangement may be provided at or proximate to the compressor housing. Alternatively or in addition it may be provided at, or proximate to, the turbine housing.

According to a second aspect of the present invention there is provided a method for operating a turbocharger of the kind defined above whereby the valve is moved between the first and second positions depending on the prevailing pressure in the compressor housing or the turbine housing.

The gas supply path may be selectively connected to the turbine housing or an outlet of the compressor housing depending on a mode of operation of engine. For example it may be connected to the turbine housing when the engine is operated in engine braking mode and it may be connected to the compressor outlet when the engine is operated in normal engine-fired mode or any other mode.

A specific embodiment of the present invention will now be described, by way of example only, with reference to the accompanying drawings in which.

Figure 1:
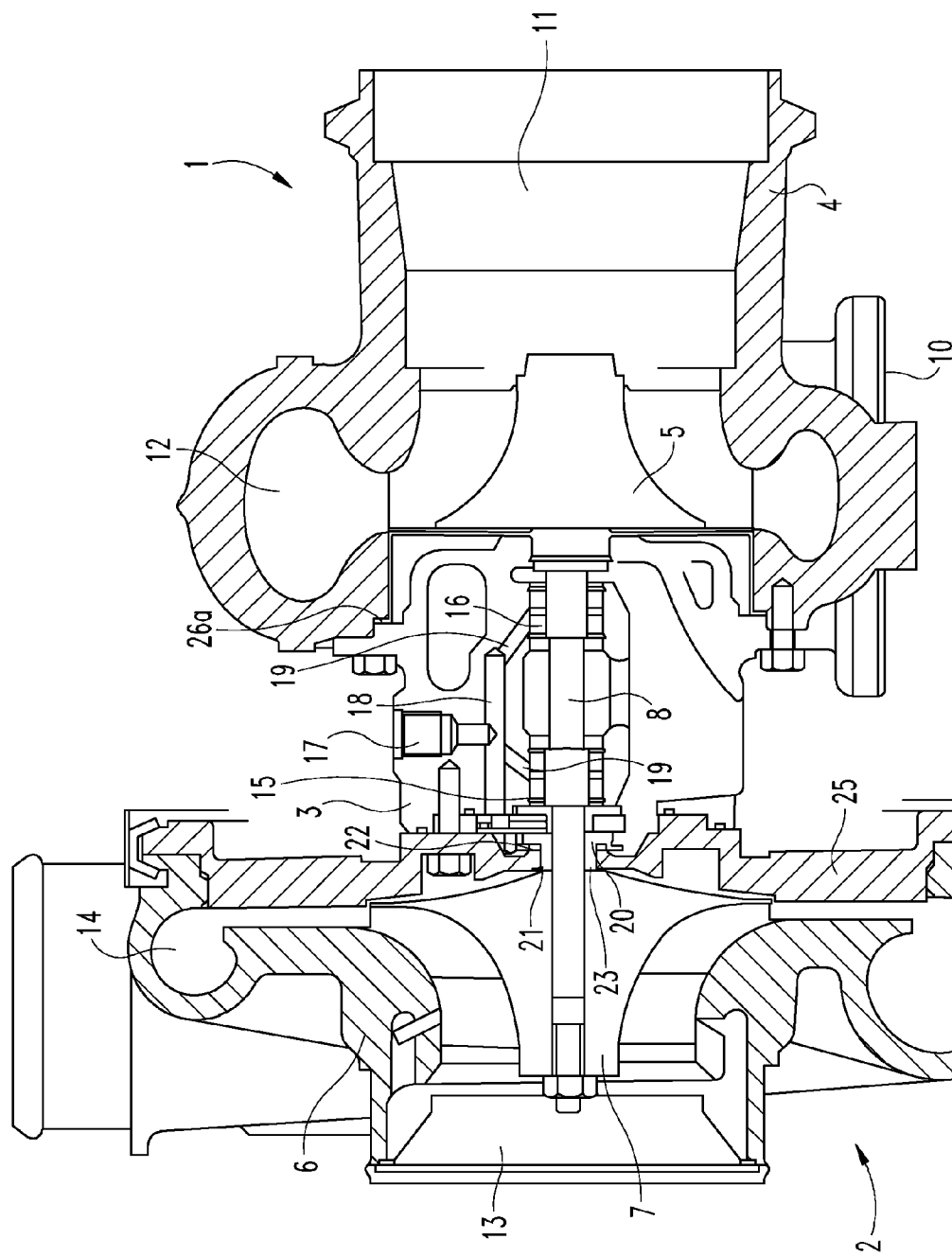
FIG. 1 is a longitudinal sectioned view of a turbocharger.

Referring now to FIG. 1 of the drawings, the turbocharger comprises a turbine 1 joined to compressor 2 via a central bearing housing 3. The turbine 1 comprises a turbine housing 4 which houses a turbine wheel 5. Similarly, the compressor 2 comprises a compressor housing 6 that houses a compressor impeller wheel 7. The turbine wheel 5 and compressor impeller wheel 7 are mounted on opposite ends of a common rotary shaft 8 which is supported on bearing assemblies within the bearing housing 3.

The turbine is provided with an exhaust gas inlet 10, which receives exhaust gas from an engine outlet manifold, and an exhaust gas outlet 11. The inlet 10 directs the incoming exhaust gas to an annular inlet chamber 12 which forms a volute surrounding the turbine wheel 5. The exhaust gas flows through the turbine 1 and into the outlet 11 via a circular outlet opening which is coaxial with the turbine wheel 5. In so doing the exhaust gas rotates the turbine wheel 4 which in turn rotates the shaft 8 and compressor impeller wheel 7. The latter draws air in through a compressor inlet 13 and delivers compressed air (boost) to the inlet manifold of an internal combustion engine via an outlet volute 14.

The turbocharger shaft 8 rotates on fully floating journal bearings 15 and 16 housed towards the turbine end and compressor end of the bearing housing 3. Oil is fed to the bearings 15, 16 under pressure from the oil system of the engine via an oil inlet 17, gallery 18 and passages 19. Each journal bearing is retained in place by circlips and is provided with circumferentially spaced radial holes for oil to pass to the turbocharger shaft 8. From there the oil drains out of the bearings and returns to the engine sump (not shown).

The compressor end of the shaft 8 has an oil seal assembly comprising an oil slinger 20 rotatable with the shaft 8 and a pair of axially spaced sealing rings 21, 22. The slinger 20 has an integral axial boss 23 that extends into a bore 24 defined in a back plate 25 of the compressor 2 and towards the impeller wheel 7. It will be appreciated that the back plate 25 may be a separate component or may be integrally formed with the bearing housing 3. In order to accommodate the sealing rings 21, 22, the boss 23 has pair of axially spaced circumferential grooves 26, 27 defined on its outer surface. These are shown most clearly in FIGS. 2 and 3. The grooves 26, 27 face an annular surface 28 of the back plate 25 that serves to define the bore 24. The sealing rings 21, 22 are in the form of split piston rings that have a gap or split in the ring that allows it to be placed in position. The split allows ends of the ring to be moved together so as to reduce slightly the diameter of the ring during insertion and then released such that it expands outwards. In this instance the rings expand outwards such that they are supported on the annular surface 28. Each of the sealing rings 21, 22 has a rectangular or square cross section and extends radially inwards into the grooves 26, 27 where it helps to seal between the oil slinger 20 and the back plate 25 so as to prevent oil supplied to the bearings from leaking into the compressor housing where it would contaminate the pressurised air being supplied to the engine intake manifold.

In an alternative embodiment the sealing rings 21, 22 may be supported on the oil slinger 20 and extend into grooves defined in the back plate 25 of the compressor.

Figure 2:
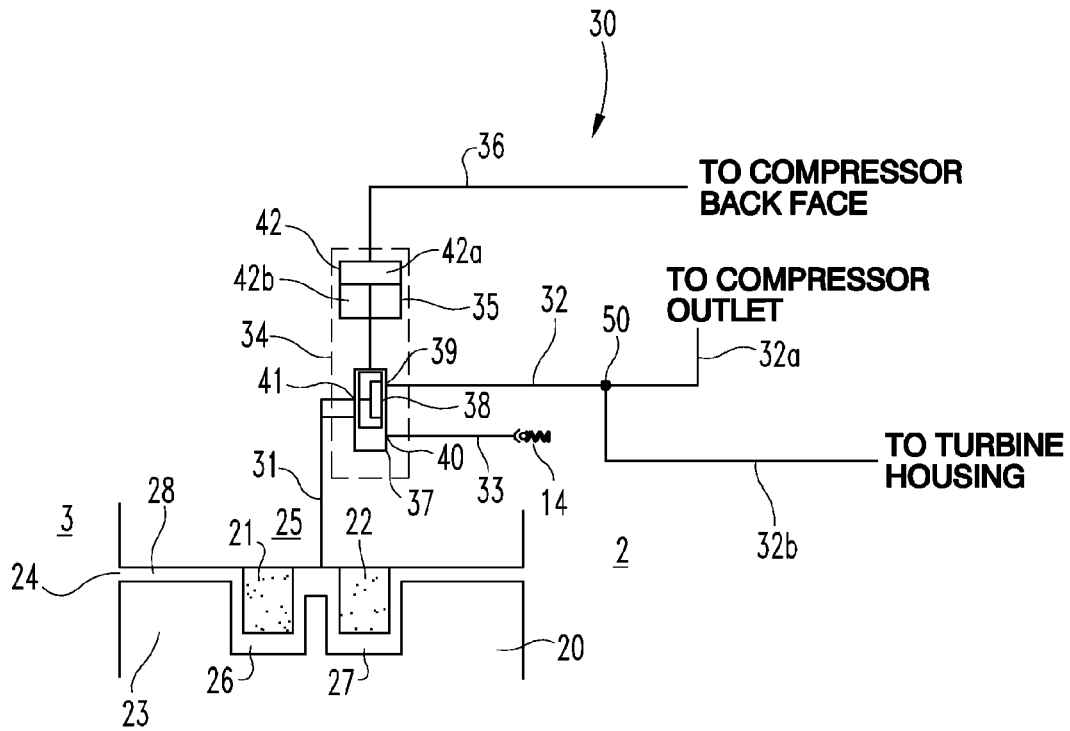
FIG. 2 is a schematic representation illustrating the application of high pressure to a sealing arrangement of the turbocharger.

Referring now to FIG. 2, the above-described sealing arrangement is shown connected to a gas distribution circuit 30 that is designed to ensure that sealing is effective. In situations where the pressure differential over the sealing rings 21, 22 drops the circuit supplies pressurised air to the area around the sealing rings from a suitable source. Moreover, it situations where the pressure drop across the sealing rings 21, 22 is relatively high the risks associated with blow-by are mitigated.

The gas distribution circuit 30 comprises a gas passage 31 that extends along the back plate 25 to a location between the two sealing rings 21, 22, a gas supply flow path 32 for supplying gas to the gas passage 31 and therefore the sealing arrangement and a vent path 33 for venting the gas from the sealing arrangement. The latter two paths 32, 33 may be defined, at least in part, by bores drilled into the bearing housing 3. The circuit 30 has a two-position shuttle valve assembly 34 that is operated to connect the gas passage 31 to the supply flow path 32 or vent path 33 depending on the prevailing conditions in the turbocharger. In the embodiment shown the valve assembly 34 includes a conventional piston and diaphragm arrangement 35 that is actuated in response to a control signal in the form of air pressure supplied from the back face of the compressor to a control line 36.

It will be appreciated that any suitable valve assembly may be used including an assembly that is designed to be actuated in response to a control signal from an engine management/control unit (ECU/EMU). In such an arrangement the EMU/ECU may have a control map that determines when the control signals are issued to the valve in response to appropriate received signals that are representative of operating parameters of the turbocharger. For example, the valve assembly may include a solenoid-operated valve in which the control signal is an electrical pulse from, for example, the engine management/control unit (not shown).

Figure 3:
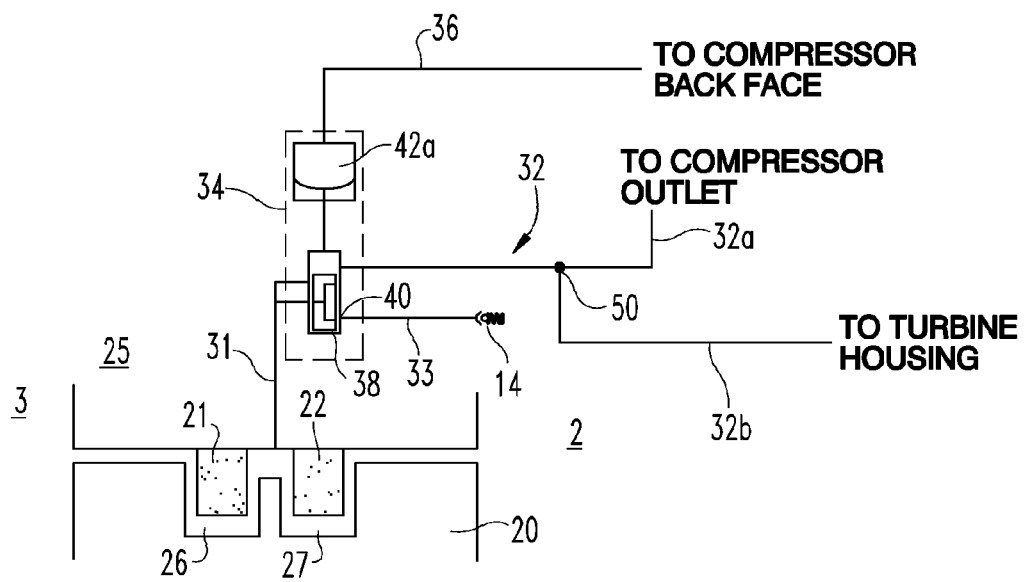
FIG. 3 is a schematic representation illustrating the venting of blow-by gases from the sealing arrangement.

In the embodiment shown in FIGS. 2 and 3, the valve assembly 34 comprises a housing 37 within which there is an axially moveable shuttle 38. The housing is penetrated by a first port 39 connected to the gas supply flow path 32, a second port 40 connected to the vent path 33 and a third port 41 connected to the gas passage 31. The shuttle 38 is coupled to the piston/diaphragm 35 such that it is moveable in response to a pressure control signal received from the compressor. The piston diaphragm 35 is of conventional design and comprises a casing 42 that is internally divided into two variable volume chambers 42a, 42b by means of a flexible diaphragm which is coupled to an axially moveable piston. One of the chambers 42a is connected to the control pressure source whereas the other may be connected to atmosphere or a suitable reference pressure. When the force applied by the control pressure signal to one side of the diaphragm 35 exceeds the force applied by the reference pressure acting on the other side of the diaphragm 35 the variable volume chamber 42a above the diaphragm increases in volume so as to deflect the diaphragm and piston arrangement 35 downwardly thereby moving the shuttle 38. It will be understood that instead of a reference pressure there may be a biasing force applied by a mechanical resilient member such as for example a compression spring disposed in the lower variable volume chamber 42b.

The shuttle 38 is penetrated by gas flow passage for selective communication with the ports 39, 40 and 41 and moves within the housing 37 between a first position in which it permits flow between the first and third ports 39, 41 but blocks flow between the second 40 and third ports 41 and a second position in which flow between the first and third ports 39, 41 is blocked but that between the second and third ports 40, 41 is permitted.

The gas supply path 32 has a first branch 32a that is connected to a suitable port at the compressor outlet 14 and a second branch 32b to a port on the turbine housing 4. The prevailing highest pressure at the compressor outlet and the turbine housing is thus fed to the first port 39 of the valve assembly 34. A second valve 50 is optionally disposed between the two branches 32a, 32b of the supply and is selectively operated to control which is connected to the first port 39.

The vent path 33 is fitted with a check valve 44 and is connected either to atmosphere (via a filter) or to a port in the inlet 13 of the compressor 1.

The first position of the valve shuttle is shown schematically in FIG. 2 in which the control signal pressure in control line 36 is relatively low such that the pressure acting on the piston diaphragm 35 is not sufficient to move the shuttle 38 from the first position against the force applied by the reference pressure or biasing force. The low control signal pressure is reflective of a low pressure in the compressor housing 6 owing to a low speed of rotation of the impeller wheel 7. This may be as a result of the engine being operated in engine braking mode as described above or simply as a result of the engine idling. In such circumstances the pressure drop over the sealing rings 21, 22 is relative low and there is a risk of leakage. The relatively high pressure air from the compressor outlet 14 or gas from the turbine housing 4 is fed to the gas passage 31 and therefore to the space between the sealing rings 21, 22 to counter the risk.

When there is a second valve 50 in the vent path 33, the second valve 50 may be operated such that the gas is supplied from the turbine housing 4 when the engine is operating in engine braking mode e.g. whenever the exhaust brake is applied, but is supplied from the compressor outlet 14 during normal fired mode and all other operating modes. In such an arrangement the second valve 50 is simply operated at the same time as the exhaust gas brake is applied by, for example, a signal from the engine management/control unit. It will be appreciated that in an alternative embodiment the second valve 50 could be omitted and the main valve 34 provided with separate ports for connection to the compressor outlet 14 or the turbine housing 5.

The second position of the shuttle 38 is shown in FIG. 3. In this instance the control pressure signal in the control line 36 from the compressor 2 is relatively high. This is reflective of a high turbocharger speed and a relatively high pressure drop over the sealing rings 21, 22. In such instances the air passing over the sealing rings 21, 22 would otherwise tend to enter the bearing housing 3 and add to blow-by gases within the crank case (not shown) with the disadvantages described in the introductory part of the specification. The valve shuttle 38 connects the gas passage 31 to the vent path 33 so that high pressure air may be vented to atmosphere or to the compressor inlet 13. This may reduce the load on the crank case ventilation system of the engine (which operates to filter the oil from the gas in the crank case before venting it to atmosphere) as there would be less oil/air mixture to separate and may serve to reduce emissions by reducing the volume of blow-by gas.

It is to be appreciated that whilst in the embodiment described above the bore 24 is defined a back plate 25 associated with the compressor, it may alternatively be defined in part of the bearing housing 3.

Although not shown, a similar arrangement could be incorporated into the turbine end seal arrangement using the pressure behind the turbine wheel to generate the control signal for operation of the valve. When the pressure behind the turbine wheel is low such as immediately after engine braking the positive pressure differential from the bearing housing to the turbine housing is such that there is a risk of oil leakage into the turbine housing. The pressure in the control line 36 from the turbine back face actuates the valve assembly 34 such that the relatively high pressure air from the compressor outlet 14 or gas from the turbine housing 4 is fed to the gas passage 31 and therefore to the space between the sealing rings at the turbine end of the shaft. When the pressure at the back face of the turbine is high such as during engine braking or sometimes during engine fired mode, the valve assembly 34 is actuated such that the relatively high pressure air from the compressor outlet or gas from the turbine housing is directed to the vent path 33.

It will be appreciated that the bore may be defined in part of the bearing housing 3 or part of the turbine housing 4.

The above described invention may have application in a multi-stage turbocharging system in which there is at least one relatively small high pressure (HP) turbocharger and at least one relatively large low pressure (LP) turbocharger. The turbochargers are arranged in series so that exhaust from the engine flows first through the smaller turbine of the HP turbocharger and then through the larger turbine of the LP turbocharger. A valve-controlled bypass path is provided for allowing exhaust gas to bypass the HP turbine for instance at high engine speeds and/or loads. Similarly, the compressors of the two turbochargers are also arranged in series, with air flowing first through the relatively large compressor of the LP turbocharger and then through the relatively small compressor of the HP turbocharger. Again, a valve controlled bypass is provided to allow the inlet air to bypass the compressor of the HP turbocharger for instance at high engine speeds and/or loads. In instances where air bypasses a compressor the rotation of the impeller wheel slows and there is a risk of oil leakage for the reasons discussed above. The present invention may be adopted in such applications in order to mitigate this risk.

It will be appreciated that numerous modifications to the above described design may be made without departing from the scope of the invention as defined in the appended claims. For example, although the valve described is a shuttle valve in which the shuttle include flow passages it will be understood that any other suitable type of valve may be used to ensure the gas flows in the required directions to or from the shaft bore. Moreover, it will be appreciated that the gas flow paths may be defined by any suitable means in or around any suitable part of the turbocharger. Furthermore, it may be appreciated that the invention is not limited to an application where there are two sealing rings; there may be more than two or even only one.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A turbocharger comprising:
    a compressor for delivering pressurised air to an intake of an internal combustion engine, the compressor comprising a compressor housing and a compressor impeller disposed in the compressor housing:
    a turbine bar receipt of exhaust gas from the engine, the turbine comprising a turbine housing and a turbine wheel disposed in the turbine housing;
    a turbocharger shaft interconnecting the compressor impeller and the turbine wheel;
    a bearing housing disposed between the compressor and turbine for housing a bearing assembly to support the turbocharger shaft in rotation;
    a shaft bore defined in at least one of the compressor, turbine or bearing housings for receipt of the shaft;
    a sealing arrangement for restricting leakage of lubricant along the shaft bore from the bearing housing to the compressor or turbine housing, the sealing arrangement comprising at least one sealing member disposed around the shaft in the shaft bore and a gas passage communicating with the shaft bore; and
    a valve movable between a first position in which the gas passage is in communication with a gas supply path for supplying gas to the shaft bore and a second position in which the gas passage is in communication with a vent path for venting gas from the shaft bore;
    wherein the valve is arranged such that it is movable in response to the prevailing pressure within the compressor or turbine housing at a location in fluid communication with the sealing arrangement.

2. A turbocharger according to claim 1, wherein the at least one sealing member is a substantially annular member supported on a substantially annular surface defined by the shaft bore.

3. A turbocharger according to claim 2, wherein at least one sealing member extends inwards into at least one groove defined on an outer surface of the shaft or of a component mounted on the shaft.

4. A turbocharger according to claim 1, wherein there is a pair of sealing members disposed in the shaft bore such that they are axially separated and define a space between them, and wherein the gas passage is in communication with the space.

5. A turbocharger according to claim 1, wherein the gas supply path is in communication with an outlet of the compressor.

6. A turbocharger according to claim 1, wherein the gas supply is in communication with the interior of the turbine housing.

7. A turbocharger according to claim 1, wherein the gas supply path has a firm part in communication with an outlet of the compressor and a second part in communication with the interior of the turbine housing and there is provided a valve between the first and second portions for selectively opening or closing the first and second part.

8. A turbocharger according to claim 1, wherein the gas vent path is in communication with an inlet of the compressor inlet and/or atmosphere.

9. A turbocharger according to claim 1, wherein the gas passage is defined in a back plate of the compressor housing.

10. A turbocharger according to claim 1, wherein the valve has a control input for receiving a control signal that effects movement of the valve between the first and second positions.

11. A turbocharger according to claim 10, wherein the control input is in communication with the interior of the compressor or turbine housing in a location in fluid communication with the sealing arrangement.

12. A turbocharger according to claim 10, wherein the valve comprises a valve member that is movable dependent on the control signal.

13. A turbocharger according to claim 10, 11 or 12, wherein the sealing arrangement is provided at or proximate to the compressor and the control input is in communication with the interior of the compressor housing.

14. A method for operating a turbocharger which has a shaft bore defined in at least one of a compressor, turbine or bearing housings for receipt of turbocharger shaft, a sealing arrangement for restricting leakage of lubricant along the shaft bore from the bearing housing to the compressor or turbine housing, the sealing arrangement completing at least one sealing member disposed around the shaft in the shaft bore and a gas passage communicating with the shaft bore, the method comprising the steps of selectively moving the valve between a that position in which the gas passage is in communication with a gas supply path for supplying gas to the shaft bore and a second position in which the gas passage is in communication with a vent path for venting gas from the shaft bore wherein the valve is moved in response to the prevailing pressure within the compressor or turbine housing at a location in fluid communication with the sealing arrangement.

15. A method according to claim 14, wherein the gas supply path is in communication with the interior of the turbine housing and/or an outlet of the compressor housing.

16. A method according to claim 15, wherein the turbocharger is operatively connected to an internal combustion engine and the gas supply path is selectively placed in communication with the outlet of the compressor housing and/or an interior of the turbine housing depending on a mode of operation of the engine.

17. A method according to claim 16, wherein the gas supply path is selectively placed in communication with the outlet of the compressor housing when the internal combustion engine is operated in engine-fired mode and/or is selectively placed m communication with the interior of the turbine housing when the engine is operated in engine braking mode.

18. A method for operating a turbocharger which has a shaft bore defined in at least one of a compressor, turbine or bearing housings for receipt of a turbocharger shaft, a sealing arrangement for restricting leakage of lubricant along the shaft bore from the bearing housing to the compressor or turbine housing, the sealing arrangement comprising at least one sealing member disposed around the shaft in the shaft bore and a gas passage communicating with the shaft bore, the method comprising the steps of selectively moving a valve between a first position in which the gas passage is in communication with a gas supply path for supplying as to the shaft bore and a second position in which the gas passage is in communication with a vent path for venting gas from the shaft bore, the gas supply path is in communication with the interior of the turbine housing and/or an outlet of the compressor housing, wherein the turbocharger is operatively connected to an internal combustion engine and the gas supply path is selectively placed in communication with the outlet of the compressor housing and/or an interior of the turbine housing depending on a mode of operation of the engine.

19. A method according to claim 18 wherein the gas supply path is selectively placed in communication with the outlet of the compressor housing when the internal combustion engine is operated in engine-fired mode and/or is selectively placed in communication with the interior of the turbine housing when the engine is operated in engine braking mode.

* * * * *

UNITED STATES PATENT AND TRADEMARK OFFICE
CERTIFICATE OF CORRECTION

| | | |
|---|---|---|
| PATENT NO. | : 8,961,151 B2 | Page 1 of 1 |
| APPLICATION NO. | : 13/437272 | |
| DATED | : February 24, 2015 | |
| INVENTOR(S) | : Fahim Ismail Patel et al. | |

It is certified that error appears in the above-identified patent and that said Letters Patent is hereby corrected as shown below:

In the Claims

Claim 1, line 30, the word "bar" should be --for--.

Claim 7, line 8, the word "firm" should be --first--.

Signed and Sealed this
Tenth Day of November, 2015

Michelle K. Lee
*Director of the United States Patent and Trademark Office*